Dec. 27, 1938.  A. BELLM  2,141,898
ELECTRIC SWITCH GEAR
Filed Dec. 24, 1936

Inventor:
Anton Bellm,
by Harry E. Dunham
His Attorney.

Patented Dec. 27, 1938

2,141,898

UNITED STATES PATENT OFFICE 2,141,898

ELECTRIC SWITCH GEAR

Anton Bellm, Dresden, Germany, assignor to General Electric Company, a corporation of New York Application December 24, 1936, Serial No. 117,645
In Germany January 4, 1936

4 Claims. (Cl. 175—298)

This invention relates to electric switchgear of the draw-out type wherein an electric circuit interrupting unit is bodily movable to connected and disconnected positions with respect to coacting stationary circuit connections, and has for its principal object the provision of improved switchgear of the aforesaid type which is operable in a predetermined sequence to maintain continuity of service of the associated circuit, notwithstanding disconnection of the circuit interrupting unit, and which is simple, compact and rugged in construction.

My invention will be more fully set forth in the following description referring to the accompanying drawing, and the features of novelty which characterize my invention will be pointed out with particularity in the claims annexed to and forming a part of this specification.

Figure 1:
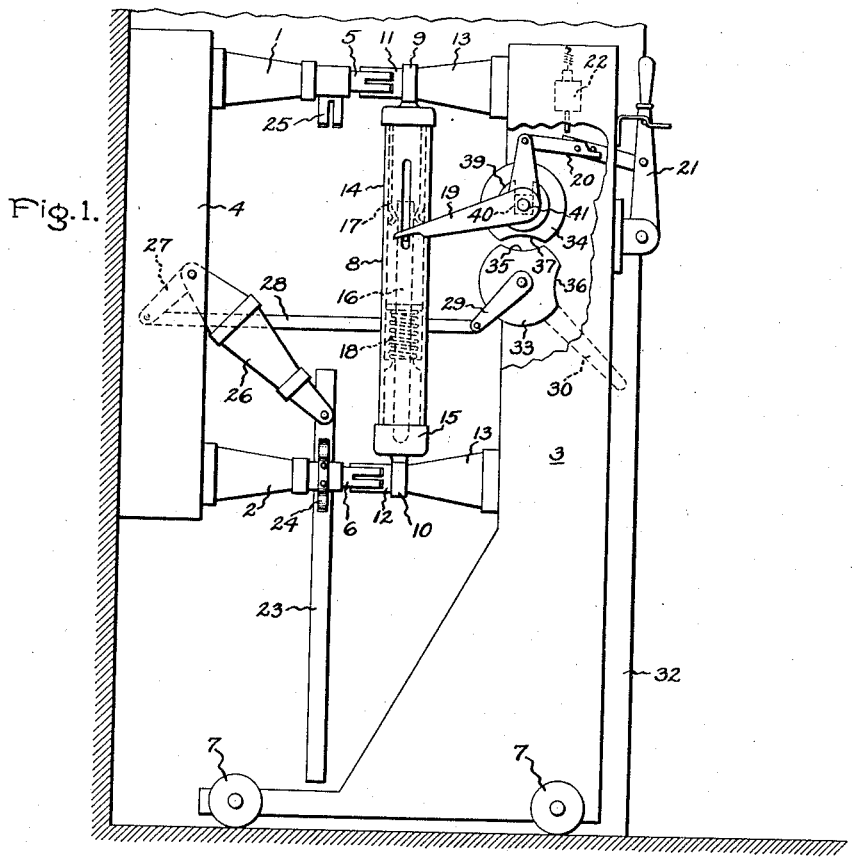
Figure 2:
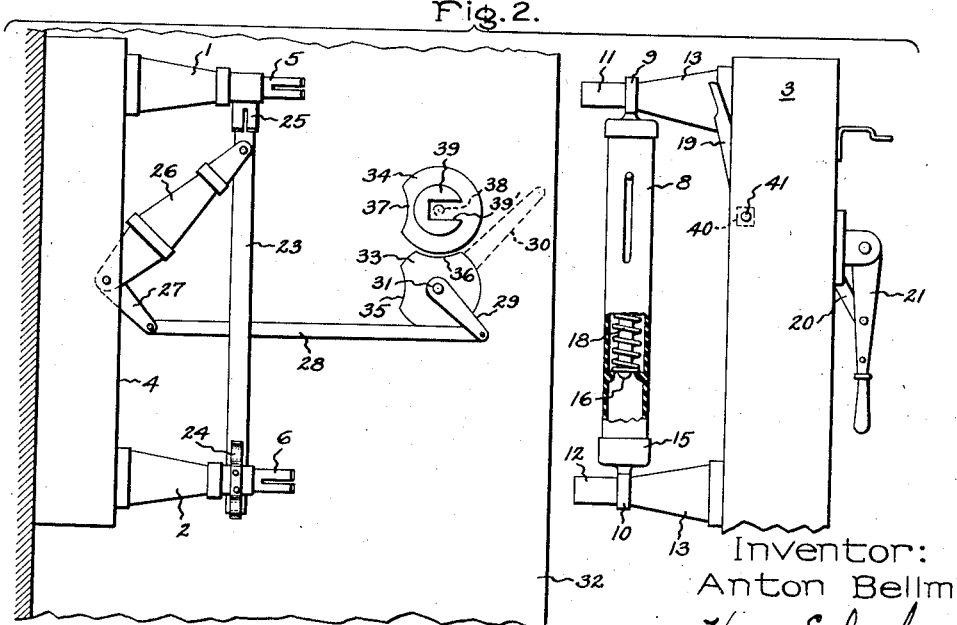

Referring to the drawing, Fig. 1 is an elevational view, partly in section, of electric switchgear embodying the present invention wherein a circuit breaker is in the closed and connected position, and Fig. 2 is a similar view showing a part of the switchgear wherein the circuit breaker is open and disconnected and the main circuit is closed.

In the operation of branch circuits of a power transmission system it may be desirable for reasons of economy to dispense with a power circuit breaker for each branch. It has been customary in many cases to operate branch rural lines, for example, simply through an air-break disconnecting switch having fuse protection. In such cases however continuity of service is not maintained when the air-break disconnecting switch is taken out of service for inspection or repair after interrupting the branch load.

In accordance with the present invention each branch line is provided with terminals for coacting with both a power circuit breaker of the draw-out type and a load transfer switch. The power breaker and the load transfer switch are interlocked so that when the power breaker is connected to said terminals and is in the closed circuit position, the load transfer switch can be operated between said terminals and in parallel with said power breaker so as either to bridge said terminals, thereby shunting the power breaker, or to cut in said power breaker. When the power breaker is in the open circuit position, either when connected to said terminals or otherwise, operation of the load transfer switch is not possible.

With this arrangement it will be apparent that one power breaker at a given station may be used for multiple branch service, the power breaker being merely disconnected and rolled to another point for serving another branch line, the former branch line carrying its normal load through the load transfer switch.

In Fig. 1 there is shown electric switchgear comprising stationary circuit terminals generally indicated at 1 and 2, and a coacting relatively movable circuit-interrupting unit 3. The terminals 1 and 2 are suitably mounted in vertical alinement on a panel or support 4 and terminate in contact members 5 and 6 respectively. The movable circuit-interrupting unit 3 can be of the truck type as illustrated, the unit being mounted for horizontal reciprocal movement with respect to the terminals 1 and 2 by means of truck rollers 7.

The unit 3 includes an electric circuit breaker 8, the opposite terminals of which at 9 and 10 are electrically connected to contacts 11 and 12 respectively for coacting with the contacts 5 and 6. The coacting contacts at 5—11 and 6—12 are preferably of the finger or plug and socket types for insuring good contact engagement when the circuit breaker unit 3 is in the connected position as illustrated by Fig. 1.

The circuit breaker 8 which is suitably supported by the truck unit 3 through insulators 13 may comprise any suitable power-interrupting unit and comprises in the present instance an insulating cylinder 14 forming a main arc-interrupting chamber containing relatively movable contacts including a lower fixed contact at 15 and a coacting vertically movable rod contact 16. The lower contact 15 is electrically connected to the breaker terminal 10 and the rod contact 16 is electrically connected, such as through sliding contacts at 17 to the upper breaker terminal 9. Consequently, when the breaker is opened by elevation of the rod contact 16, such as by a spring 18 for example, the circuit between the terminals 1 and 2 is interrupted insofar as the power breaker is concerned.

The operating means for the circuit breaker 8 is illustrated simply by way of example, the rod contact 16 in the present instance being held in its closed circuit position against the bias of spring 18 by a crank 19, overset toggle linkage 20 and an operating handle 21. The toggle 20 is related to a conventional tripping solenoid 22 which when energized causes collapse of the toggle 20 and the clockwise rotation of the crank 19 under the bias of the breaker opening spring 18. Closing of the breaker is effected simply by resetting of the toggle by the operating handle 21 and by rotating the handle counterclockwise to its initial position as shown by Fig. 1.

For the purpose of completing the circuit between the terminals 1 and 2 for maintaining continuity of service when the interrupting unit 3 is rolled to its disconnected position, there is provided a load transfer or current-carrying switch comprising a movable conducting rod 23 slidably connected to the terminal 2 at 24 and adapted to engage contact 25 connected to the terminal at 1. The load transfer switch is operated by a rotatably mounted insulator 26 which is in turn connected through a crank 27 and link 28 to an interlock and operating crank 29. It will be apparent that rotation of the crank 29 through an operating handle 30 is effective to raise or lower the switch member 23 with respect to the contact 25. As best illustrated by Fig. 2 the crank 29 is carried by a stub shaft 31 which is rotatably mounted in a side wall 32 of the stationary enclosing structure.

Since the load transfer switch member 23 is intended merely to carry current and not to interrupt or make a power circuit, the load transfer switch and the power breaker, which are connected in parallel, are inter-related by interlocking means so that operation of the load transfer switch is prevented, except when the power breaker is in the closed circuit position and is connected to the circuit terminals as illustrated by Fig. 1. In this position the transfer switch handle 30 can be freely operated either to close the transfer switch, thereby connecting the same in parallel with the power breaker or to open the transfer switch leaving the power breaker connected in the circuit.

The interlocking means in the present instance comprises a pair of rotatable members or disks 33 and 34 coacting with the transfer switch and power breaker respectively. The centers of the disks, which are mounted in the same plane, are spaced by a distance which is less than the combined radii of the disks. Notches are provided in the disks, the disk 33 being notched at 35 and 36 and the disk 34 being notched at 37 for permitting free rotation of one or both disks under predetermined conditions.

The disk 34, which is likewise mounted on a stub shaft 38 carried by the side wall 32 is provided with a notched hub portion 39 which in the position shown by Fig. 2 is adapted to receive in locking engagement a squared transverse shaft 40 rotatably mounted in the switch unit 3 at 41. The shaft 40 is secured to and rotatable with the breaker operating crank 19. Therefore, when the breaker unit 3 is rolled into connected position and is then closed, rotation of the shaft 40 in closing the breaker causes corresponding rotation of disk 34 to a non-blocking position with respect to disk 33. Operation of the load transfer switch is then possible.

Also the breaker unit 3, when disconnected, is blocked by the hub member 39 except when the disk 34 is in the transfer switch locking position shown wherein the squared notch at 39' is in registry with the squared shaft 40. That is, the transfer switch must be locked in either its open or closed position. If the transfer switch is locked closed the disk 34 is in registry with the notch 36 of the disk 33 thereby locking the same and preventing operation of the load transfer switch. The disk 34 is likewise in registry with the notch 35 of the disk 33 when the transfer switch is locked in the open circuit position. Accordingly it will be noted that the transfer switch can neither be operated to break the circuit or make the circuit under load when the breaker unit is open or withdrawn.

The operation can be summarized briefly as follows; when the breaker unit is rolled into operative position the squared shaft 40 moves into the corresponding notch in the hub member 39 so that subsequent rotation of the shaft 40 in response to the switch closing operation rotates the disk 34 approximately 90 degrees counterclockwise to the position shown by Fig. 1. In this position the notch 37 permits free rotation of the disk 33 so that the load transfer switch can be either opened or closed. Tripping of the power breaker causes the blocking disk 34 to move within notch 35 or 36, depending on whether the transfer switch is in the open or closed circuit position, to prevent operation of the transfer switch until the breaker is again closed and connected to the circuit terminals.

It will be apparent that with this arrangement a plurality of branch circuits within a single station can be served by a single power breaker, the various transfer switches normally carrying the load current until it is desired to interrupt the circuit. Overload protection for the branch circuits may include fuses if desired.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. Electrical switchgear of the draw-out type comprising electric circuit terminals, a power interrupting unit including operating means coacting with said terminals and movable to connected and disconnected positions with respect thereto, a load transfer switch adapted to be connected in parallel with said unit across said terminals and operable independently of said power interrupting unit, and interlocking means including coacting rotatable members interrelating the operating means of said unit and transfer switch for blocking operation of said switch except when said interrupting unit is in the closed circuit position and connected to said terminals, and for blocking movement of said unit to connected position except when said switch is closed and to disconnected position except when said switch is closed or said unit is in its open circuit position.

2. Electric switchgear of the draw-out type comprising stationary structure including electric circuit terminals, a circuit breaker unit including operating means bodily movable to connected and disconnected positions with respect to said terminals, a load transfer switch adapted to be connected in parallel with said circuit breaker unit across said terminals and mounted with respect to said stationary structure, and interlocking means including coacting rotatable members likewise mounted with respect to said stationary structure for insuring predetermined sequence of operation of said load transfer switch and circuit breaker unit, said interlocking means including a member coacting with said circuit breaker operating means for blocking movement of said circuit breaker unit to connected position with respect to said terminals except when said load transfer switch is in the locked position.

3. Electric switchgear of the draw-out type comprising electric circuit terminals, a load transfer switch coacting with said terminals for completing the circuit, a movable truck type circuit breaker unit also coacting with said terminals so that said circuit breaker unit is in parallel with said load transfer switch in the connected position, a pair of rotatable members having interlocking portions operatively related to said load transfer switch and circuit breaker unit respectively, and means for disengageably relating said circuit breaker unit to its corresponding rotatable member for permitting relative bodily movement of said unit with respect thereto.

4. Electric switchgear of the draw-out type comprising stationary electric circuit terminals, a load transfer switch coacting with said terminals for completing the circuit, a movable circuit breaker unit likewise coacting with said terminals for connecting said breaker unit in parallel with said load transfer switch, a pair of rotatably mounted disks relatively fixed with respect to said terminals, said disks being substantially in the same plane and having the centers thereof spaced by a distance less than the combined radii of the respective disks, said disks having notched portions for permitting relative rotation of one or both disks only when said load transfer switch and circuit breaker unit are in predetermined positions, and means disengageably relating one of said disks to said circuit breaker unit, said means blocking movement of said unit to connect with said terminals except when said load transfer switch is in the locked position.

ANTON BELLM.